7442X S. Newton. Sheet 1. 2 Sheets.

Printing Press.

No

Patented Feb. 26. 1833.

7442X
S. Newton.
Sheet 2. 2 Sheets.
Printing Press.
No
Patented Feb. 26. 1833.
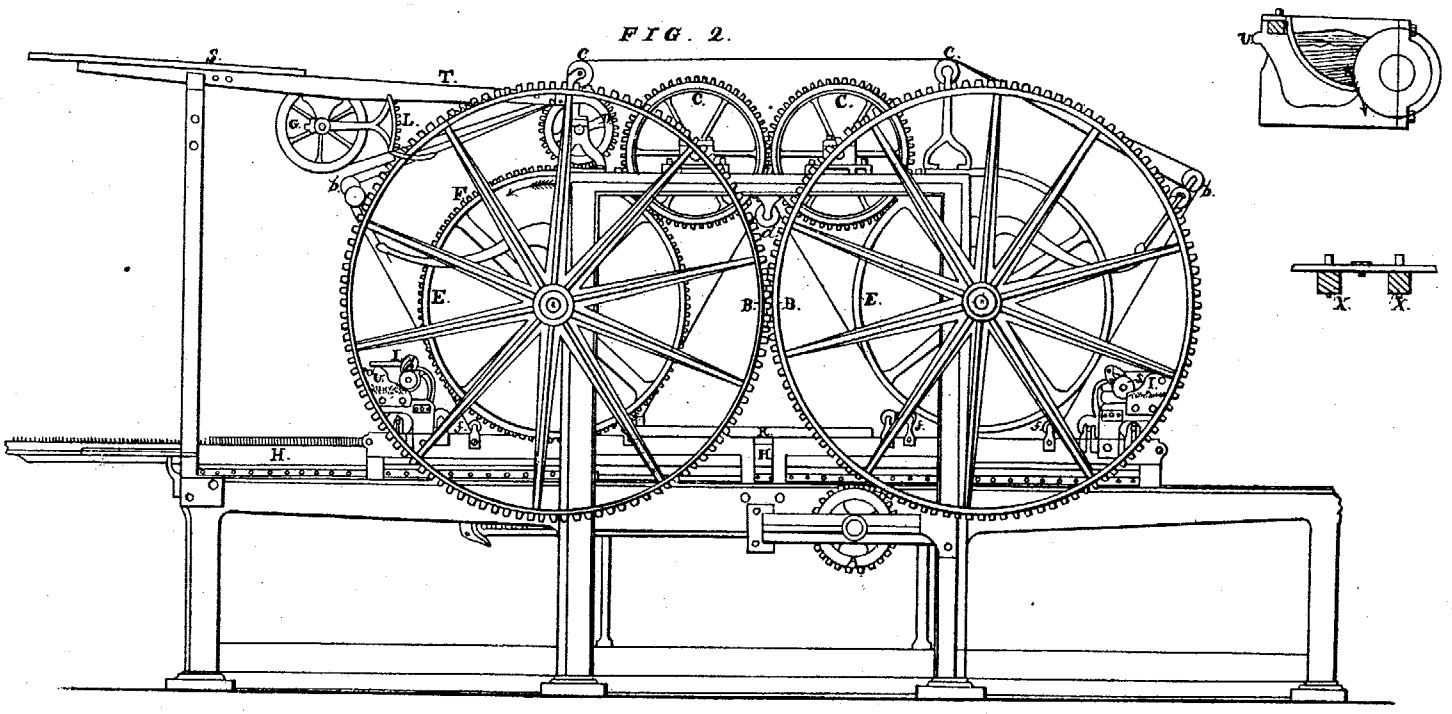

Feb 26. 1833

Isaac Newton
Letters Patent

The Schedule referred to in these Letters Patent and making part of the same containing a description in the words of the said Isaac Newton himself of his improvements in the Printing Press Denominated the Improved Double Cylinder Register Printing Press.

To all whom it may concern

Figure 1:
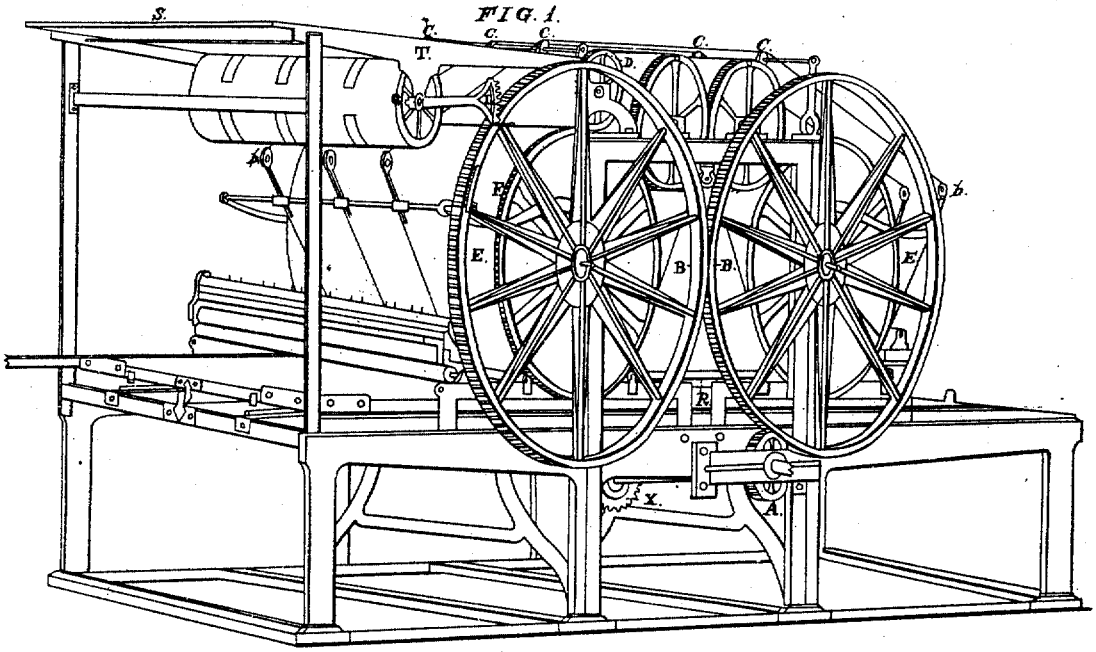
Figure 3:
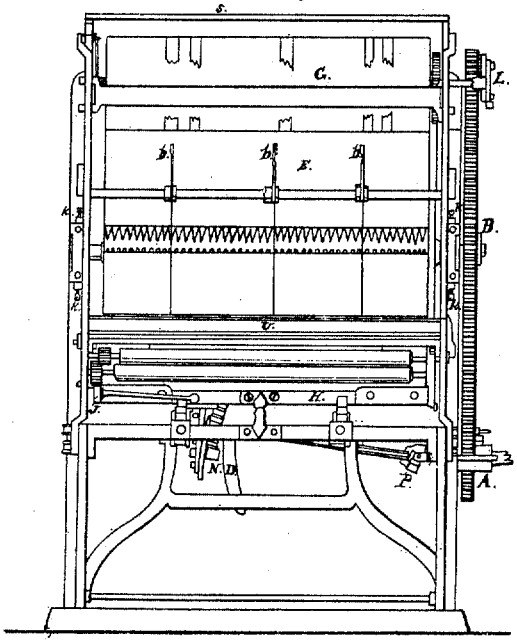

Be it known that I Isaac Newton of the City of New York have made certain Improvements in the printing press, by a new arrangement & combination of the parts of the Double Cylinder printing press which as improved I denominate The combined & improved double cylinder Register Printing Press And I do hereby declare that the following is a full & exact description of the Press reference being had to the drawings which accompany this specification & make part thereof. Fig 1 is a perspective view of the press. Fig 2 a side view & Fig 3. an end view showing the inking apparatus.

In each of these figures corresponding parts are designated by the same letters. Many of these parts are such as are already known & used in the cylinder printing presses of England & of this Country & are not therefore claimed as my invention, but are introduced for the purpose of explaining more fully the nature of my improvements. BB are two large iron cylinders placed at a suitable distance from each other with their shafts resting on bearings in the frame work of the Machinery. The toothed wheels B B attached to one end of these cylinders & are concentric with them, they are of equal size & of such diameter as to mesh into each other, HH are two cast iron beds for supporting the forms & which are connected together by an iron connecting piece on their under sides which regulates their distance from each other. They are moved backward & forward by means of a rack & pinion in the same manner as in the well known Napier printing Machine. The sheets are printed by the pressure of the cylinders BB on the two forms placed upon the beds HH [illegible] them. [illegible] is a toothed wheel attached to one of the cylinders cylinders [illegible] of about the same [illegible] with it. The teeth engage in
to those of the wheel D. on the cylinder D and into those of the wheel
C on the cylinder C. which turns the cylinder C. Round the cylin-
ders C & C. pass the tapes which carry the sheet from the board T. to the
cylinder B. [illegible] which it receives its first impression. I. is a segment
which is attached to the same cylinder G, which is acted on by a corre-
sponding segment seen in the periphery of the wheel B. A is a pinion
fastened to the shaft which is turned by the power intended to move the
machine. The pulleys & rollers marked c.c. &c.c. are for conducting
the tapes & those marked b.b. serve both to [illegible] & tighten them.
B is the bank board on which the pile of paper is first laid whence the
sheets are removed to T. to be conducted in succession to the cylinders
[illegible] afterwards on to the board R. The box with the [illegible]
of communicating motion to it thence the inking [illegible] — I & the
rollers are the same in principle as those employed in the Napier press.
The gearing of the driving wheel A. of the two large cylinder wheels B.B.
as well of the cylinders D.D. & G. the mode of using the tapes and some
other parts, are the same in principle with those machines in use in
England & elsewhere & known under the name of Cowper & Applegath's
printing machine.

What I claim as new in my press is the combining that
part of the Napier printing machine which constitutes the box & its
appendages with the cylinders & such other parts of the superstructure
of the Cowper & Applegath's printing press as are employed in the re-
ceiving & conveying of the sheets

[illegible] Witnesses
Thos. P. Jones
Chas. Bulfinch Jr.

Serrano Newton (Dr in portfolio)

[illegible]